(12) United States Patent
Tamura et al.

(10) Patent No.: US 6,764,791 B2
(45) Date of Patent: Jul. 20, 2004

(54) RECHARGEABLE LITHIUM BATTERY

(75) Inventors: Noriyuki Tamura, Katano (JP);
Masahisa Fujimoto, Osaka (JP);
Maruo Kamino, Katano (JP); Shin Fujitani, Hirakata (JP); Hiromasa Yagi, Nishinomiya (JP); Yoichi Domoto, Ikoma (JP); Hisaki Tarui, Shijyonawate (JP); Ryuji Ohshita, Neyagawa (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 261 days.

(21) Appl. No.: 09/904,514

(22) Filed: Jul. 16, 2001

(65) Prior Publication Data

US 2002/0034687 A1 Mar. 21, 2002

(30) Foreign Application Priority Data

Jul. 19, 2000 (JP) ........................ 2000-218205

(51) Int. Cl.$^7$ ............................. H01M 4/48
(52) U.S. Cl. ............ 429/231.95; 429/246; 429/232; 429/231.8; 429/231.4
(58) Field of Search ............ 429/231.95, 232, 429/246, 231.8, 231.4

(56) References Cited

U.S. PATENT DOCUMENTS 5,354,631 A * 10/1994 Chaloner-Gill et al. ..... 429/137

FOREIGN PATENT DOCUMENTS

| JP | 5-275076 A | 10/1993 |
| JP | 8-124597 A | 5/1996 |
| JP | 11-317228 A | 11/1999 |

OTHER PUBLICATIONS

Sonoda, T. et al., "Negative Electrode Characteristics of Plating Tin Film for Use in Lithium Secondary Battery"; 99th Symposium Summary of the Surface Finishing Society of Japan; pp. 114–115.
Winter, M. et al.; "Electrochemical Lithiation of Tin and Tin–based Intermatellies and Composites"; *Electrochimica Acta*; vol. 45, pp. 31–50; 1999.

* cited by examiner

Primary Examiner—Laura Weiner
(74) Attorney, Agent, or Firm—Kubovcik & Kubovcik

(57) ABSTRACT

A rechargeable lithium battery using an Li alloying metal as the active material of at least one of its positive and negative electrodes. The metal active material is covered with a thin film which is nonreactive with Li ions, permits passage of Li ions but does not have an Li ion conductivity.

9 Claims, 1 Drawing Sheet

RECHARGEABLE LITHIUM BATTERY

BACKGROUND OF THE INVENTION

1. Field of the Invention

The present invention relates to rechargeable lithium batteries and more particularly to rechargeable lithium batteries which use a lithium alloying metal for both or either of the active anode and cathode materials.

2. Description of Related Art

Rechargeable lithium batteries, because of their high energy densities, have been noted to lead the next generation. The use of metallic lithium for the negative active material, although effective to increase a charge-discharge capacity, is accompanied by lithium dissolution and deposition during charging and recharging, dendrite formation at a negative electrode and electrode deformation which together cause poor battery cycle performances and thus prevent provision of practicable batteries.

As solutions to such problems, an Li alloy negative electrode using an Li alloying metal and a carbon negative electrode using a carbon material have been proposed. The carbon negative electrode has been put into practical use for years but suffers from a problem of a larger energy density drop compared to the metallic lithium negative electrode, due to its low theoretical capacity, 372 mAh/g. On the other hand, the Li alloy negative electrode is subjected to increasing pulverization with charge-discharge cycling and thus suffers from a problem of poor cycle performances.

For example, Japanese Patent Laying-Open No. Hei 10-312804 proposes a method for improving cycle performances by using a homogeneous single-phase alloy derived via formation of a metal powder by a roll quenching process and subsequent heat treatment thereof.

However, the metal powder obtained in accordance with this method consists of large-size, homogenous single-phase alloy particles which are susceptible to a large stress, during the Li alloy formation, that problematically causes active material to fall off from a current collector. Other problem has been that the metal particles tend to grow into treelike dendrites to render active material inactive. As such, those methods have even failed to obtain sufficient cycle performance characteristics.

SUMMARY OF THE INVENTION

It is an object of the present invention to provide a rechargeable lithium battery which uses an Li alloying metal as the active material of at least one of positive and negative electrodes and which exhibit excellent cycle performance characteristics.

The rechargeable lithium battery of the present invention includes a positive electrode, a negative electrode and a nonaqueous electrolyte. Characteristically, an Li alloying metal is used as the active material of at least one of the positive and negative electrodes and this metal active material is covered with a thin film which is non-reactive with Li ions, permits passage of Li ions but does not have an Li ion conductivity.

In the present invention, the provision of such a thin film over the metal active material regulates dendrite formation or pulverization of the metal active material during charge-discharge cycles and thus prevents the metal active material from falling off from a current collector.

The thin film provided to overlie the metal active material in accordance with the present invention is the one that is nonreactive with Li ions, permits passage of Li ions but does not have an Li ion conductivity, as stated above. Because of its nonreactivity with Li ions, the thin film itself is not alloyed and thus avoids the occurrence of expansion or shrinkage. Also, the passage of Li ions across the thin film permits a cell reaction to occur and proceed in metal active material. Also, the thin film itself does not undergo deformation during charging and discharging because it does not have an Li ion conductivity, as contrary to solid electrolyte thin films.

Also in the present invention, the thin film preferably has a volume resistivity of not exceeding $10^{10}$ Ω·cm. Such a good electronic conductivity enables the thin film to also serve as a current collector.

In the present invention, the thin film can be formed such as by a CVD, sputtering or vacuum deposition process.

The thin film in the present invention is illustrated by a hard carbon thin film such as a diamond-like carbon thin film. Such a thin film is the one that does not react with Li ions, permits passage of Li ions and does not have an Li ion conductivity. The preferred hard carbon thin film shows two peaks Id and Ig in the Raman scattering spectrum, around 1400 cm$^{-1}$ and 1550 cm$^{-1}$, with a ratio (Id/Ig) in intensity of 0.5 to 3.0.

As also described above, the preferred hard carbon thin film has a volume resistivity of not exceeding $10^{10}$ Ω·cm and can be illustrated by a $CO_2$-containing hard carbon thin film with a good electrical conductivity. The $CO_2$-containing hard carbon thin film can be formed by a CVD process using a gas mixture of $CO_2$ and hydrocarbon as a source gas. Also, a good electrical conductivity can be imparted to a surface of a hard carbon thin film by treating the surface with a $CO_2$-containing gas.

The thickness of the thin film is not particularly specified, but is preferably in the approximate range of 50 to 1,000 nm, more preferably in the approximate range of 100 to 500 nm. If the thin film is too small in dimension, its presence may in some cases become ineffective to prevent the metal active material from falling off from a current collector and to regulate the treelike growth of the metal active material. On the other hand, if the thin film is too large in dimension, the passage of Li ions during charging and discharging may sometimes be regulated to result in the insufficient reaction between the metal active material and Li ions.

As noted earlier, an Li alloying metal serves as the metal active material in the present invention. The Li alloying metal may be at least one metal selected from Si, Ge, Sn, Al, In and Mg. The metal active material may be rendered into a powder form and combined with a binder to form a mix which is then coated on a current collector to fabricate an electrode, in accordance with a general procedure utilized to fabricate an electrode for use in rechargeable lithium batteries. Preferably, the metal active material is used in the form of a thin film. The metal active material may be deposited in the form of a thin film by various techniques, including CVD, sputtering, vapor deposition and plating techniques. In such a case, the metal active material, if deposited on a substrate comprised of a current collector such as a copper foil, can be made into a ready-to-use electrode. Alternatively, a metal foil may be used as the film-form metal active material. In this case, the aforementioned thin film may be placed on both sides of the film-form metal active material. In the case where a metal foil is used as the film-form metal active material, the metal foil may be allowed to serve as a current collector.

In the present invention, an interlayer may be provided between the aforesaid thin film and metal active material for purposes including improvement of adhesion therebetween. Such an interlayer may be formed from at least one selected from Si, Ti, Zr, Ge, Ru, Mo, W and their oxides, nitrides and carbides. Preferably, the interlayer has a thickness in the approximate range of 10 to 500 nm. The interlayer can be deposited by various techniques, including CVD, sputtering, vapor deposition and plating techniques.

The metal active material in the present invention may serve as either a positive or negative active material, but probably in most cases as a negative active material due to its electric potential relative to Li.

If the latter is the case, any substance conventionally known to serve as positive active material of rechargeable lithium batteries can be used to constitute the positive active material. Examples of useful positive active materials include metal oxides containing at least one metal selected from manganese, cobalt, nickel, vanadium and niobium. Examples of specific metal oxides include lithium-containing transition metal oxides such as $LiCoO_2$, $LiNiO_2$, $LiMn_2O_4$, $LiMnO_2$, $LiCo_{0.5}O_2$ and $LiNi_{0.7}Co_{0.2}Mn_{0.1}O_2$; lithium-free metal oxides such as $MnO_2$; and the like. Other substances can also be used, without limitation, if they are capable of electrochemical insersion release of lithium.

The electrolyte solvent for use in the rechargeable battery of the present invention is not particularly limited in type but can be exemplified by a mixed solvent which contains cyclic carbonate such as ethylene carbonate, propylene carbonate or butylene carbonate and also contains chain carbonate such as dimethyl carbonate, methyl ethyl carbonate or diethyl carbonate. Also applicable is a mixed solvent of the above-listed cyclic carbonate and an ether solvent such as 1,2-dimethoxyethane or 1,2-diethoxyethane. Examples of electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and mixtures thereof. Other applicable electrolytes include, for example, a gelled polymer electrolyte comprised of an electrolyte solution impregnated into a polymer electrolyte such as polyethylene oxide or polyacrylonitrile and inorganic solid electrolytes such as LiI and $Li_3N$. The electrolyte for the rechargeable lithium battery of the present invention can be used without limitation, so long as an Li compound as its solute that imparts an ionic conductivity, as well as its solvent that dissolves and retains the Li compound, remain undecomposed at voltages applied during charge, discharge and storage of the battery.

DESCRIPTION OF THE PREFERRED EXAMPLES

Figure 1:
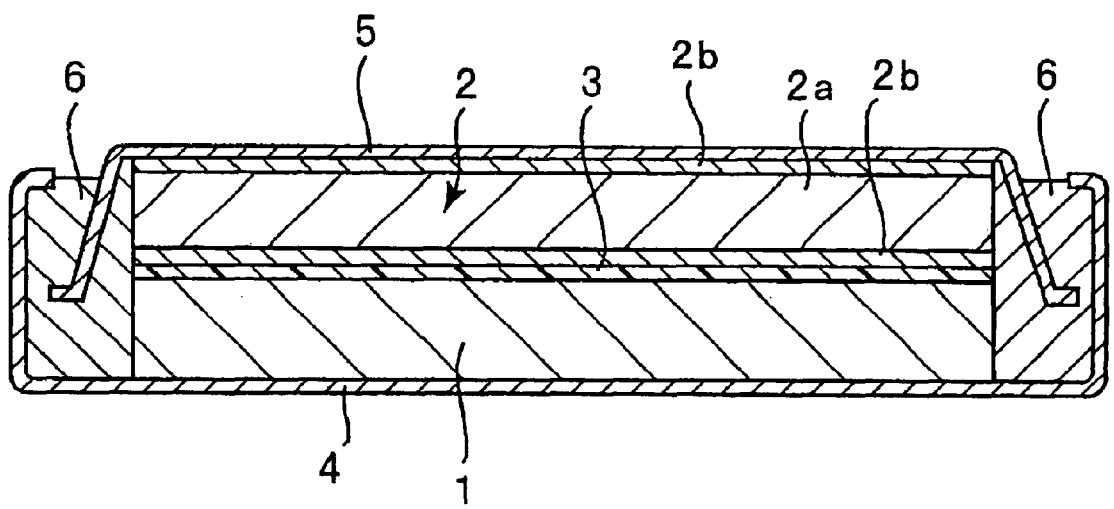
FIG. 1 is a schematic sectional view which shows a rechargeable lithium battery constructed in Example 1 in accordance with the present invention.

The present invention is now described in more detail with reference to preferred examples. It will be recognized that the following examples merely illustrate the practice of the present invention but are not intended to be limiting thereof. Suitable changes and modifications can be effected without departing from the scope of the present invention.

Example 1

Fabrication of Positive Electrode 85% by weight of $LiCoO_2$ powder with a mean particle diameter of 10 μm, 10% by weight of carbon powder as an electrically conductive agent, and 5% by weight of polyvinylidene fluoride powder as a binder were mixed. N-methyl pyrrolidone was added to the mixture which was then kneaded to form a slurry. The slurry was coated by a doctor blade technique onto both sides of a 20 μm thick current collector made of aluminum (Al). The subsequent drying resulted in a positive electrode.

Fabrication of Negative Electrode

An Si thin film (20 nm thick) as an interlayer was deposited on each side of an 18 μm thick Sn foil as metal active material by an RF sputtering technique using a target RF power of 200 W and a substrate bias voltage of −100 V. This interlayer was provided to improve adhesion between the Sn foil and a hard carbon thin film which, when directly combined, showed poor adhesion to each other.

Next, a hard carbon thin film (diamond-like carbon thin film) was deposited on the Si thin film by a CVD technique to a thickness of 50, 100, 200, 500, 800 or 1,000 nm. Specifically, an ion beam CVD technique was utilized to deposit the hard carbon thin films under the following thin film-forming conditions; $CH_4$ gas flow rate of 40 sccm, $CO_2$ gas flow rate of 10 sccm, ECR plasma source microwave power of 330 W and ion beam acceleration voltage of 200 V.

The resulting hard carbon thin films having different film thicknesses showed the same volume resistivity of about 109 Ω·cm. Each of them was measured for Raman scattering spectrum. The Raman scattering revealed a ratio Id/Ig of about 1.1 for each hard carbon thin film, where Id=peak strength around 1,400 $cm^{-1}$ and Ig=peak strength around 1,550 $cm^{-1}$.

Preparation of Electrolyte Solution An electrolyte solution was prepared by allowing 1 mole/l of $LiPF_6$ to dissolve in a mixed solvent containing ethylene carbonate and diethyl carbonate in proportions by volume of 1:1.

Construction of Rechargeable Lithium Battery A rechargeable lithium battery was constructed using the above-obtained positive electrode, negative electrode and electrolyte solution. FIG. 1 is a schematic sectional view, illustrating a constuction of the rechargeable lithium battery. The rechargeable lithium battery includes a positive electrode 1, a negative electrode 2, a separator 3, a positive case 4, a negative case 5 and an insulating gasket 6 made of polypropylene. A microporous membrane of polyethyelene is used for the separator 3. The negative electrode 2 is made by depositing a hard carbon thin film 2b on both sides of an Sn foil 2a through an Si thin film.

The positive electrode 1 and negative electrode 2 are disposed on opposite sides of the separator 3. These are accommodated within a casing defined by the positive and negative cases 4 and 5. The positive electrode 1 and negative electrode 2 are electrically connected to the positive case 4 and negative case 5, respectively, so that the battery is placed in conditions for ready charge and discharge as a rechargeable battery.

The batteries A-1 to A-6 in accordance with the present invention were constructed having respective thicknesses specified in Table 1. For comparison, a comparative battery B-1 was constructed using, for the negative electrode, an Sn foil on which niether a hard carbon thin film nor an Si thin film as an interlayer was deposited.

EVALUATION OF CHARGE-DISCHARGE CYCLE CHARACTERISTICS

Each of the above-constructed batteries was charged at 20 mA at 25° C. to 4.1 V and discharged at 20 mA to 2.75 V.

This unit cycle was repeated 10 times in total. For evaluation of cycle characteristics, a cycle efficiency (%) was calculated from the equation as defined below. The cycle efficiency of each battery is shown in Table 1. Each battery showed a mean discharge voltage of about 3.4 V.

Cycle efficiency (%)=$C_1/C_2 \times 100$ where,
$C_1$=10th cycle discharge capacity; and
$C_2$=1st cycle discharge capacity.

TABLE 1

| Designation of Battery | Film Thickness (nm) | Cycle Efficiency (%) |
|---|---|---|
| B1 | 0 | 22 |
| A1 | 50 | 60 |
| A2 | 100 | 75 |
| A3 | 200 | 78 |
| A4 | 500 | 77 |
| A5 | 800 | 69 |
| A6 | 1000 | 60 |

As apparent from Table 1, the batteries A-1 to A-6 of the present invention each including a negative electrode fabricated by depositing a hard carbon thin film on an Sn foil (filmed metal active material) through an Si thin film (interlayer) exhibit the improved cycle characteristics compared to the comparative battery B-1 using a negative electrode devoid of a hard carbon thin film.

Each battery after 10 cycles was disassembled to observe a condition of the Sn foil incorporated as negative active material. Observations of the batteries A-1 to A-6 of the present invention revealed that their Sn foils were slightly made into powder but retained their original shapes before charge-discharge cycling. On the other hand, an observation of the comparative battery B-1 revealed that its Sn foil was completely made into powder.

These observation results demonstrate that the practice of the present invention limits the negative active material from being made into powder and thereby improves cycle performance characteristics.

In accordance with the present invention, improved cycle characteristics can be imparted to rechargeable lithium batteries by the use of an Li alloying metal as active material for at least one of their positive and negative electrodes.

What is claimed is:

1. A rechargeable lithium battery including a positive electrode, a negative electrode and a nonaqueous electrolyte, wherein an Li alloying metal is used as active material of at least one of said positive and negative electrodes and said Li alloying metal is covered with a diamond-like carbon thin film.

2. The rechargeable lithium battery of claim 1, wherein said diamond-like carbon thin film shows two peaks Id and Ig in the Raman scattering spectrum, around 1400 cm$^{-1}$ and 1550 cm$^{-1}$, with a ratio (Id/Ig) in intensity of 0.5 to 3.0.

3. The rechargeable lithium battery of claim 1, wherein said thin film has a thickness of 50 to 1,000 nm.

4. The rechargeable lithium battery of claim 1, wherein said thin film has a volume resistivity of not exceeding $10^{10}$ Ωcm.

5. The rechargeable lithium battery of claim 1, wherein an interlayer is provided between said thin film and Li alloying metal.

6. The rechargeable lithium battery of claim 5, wherein said interlayer is formed from at least one selected from Si, Ti, Zr, Ge, Ru, Mo and W and their oxides, nitrides and carbides.

7. The rechargeable lithium battery of claim 1, wherein said Li alloying metal is provided in a film form.

8. The rechargeable lithium battery of claim 7, wherein said thin film is disposed on both sides of said film form Li alloying metal.

9. The rechargeable lithium battery of claim 1, wherein said Li alloying metal is at least one metal selected from Si, Ge, Sn, Al, In and Mg.

* * * * *